(12) United States Patent
Bulanda et al.

(10) Patent No.: US 8,225,461 B2
(45) Date of Patent: Jul. 24, 2012

(54) CABLE TIE HAVING BAND THREAD FORCE REDUCTION

(75) Inventors: John J. Bulanda, New Lenox, IL (US); Scott K. Benedict, New Lenox, IL (US); Michael G. Mayo, New Lenox, IL (US)

(73) Assignee: Panduit Corp., Tinley Park, IL (US)

( * ) Notice: Subject to any disclaimer, the term of this patent is extended or adjusted under 35 U.S.C. 154(b) by 956 days.

(21) Appl. No.: 12/129,034

(22) Filed: May 29, 2008

(65) Prior Publication Data

US 2009/0000082 A1 Jan. 1, 2009

Related U.S. Application Data

(60) Provisional application No. 60/940,762, filed on May 30, 2007.

(51) Int. Cl.
*B65D 63/08* (2006.01)

(52) U.S. Cl. .................................. 24/21; 24/25

(58) Field of Classification Search ........................ None
See application file for complete search history.

(56) References Cited

U.S. PATENT DOCUMENTS

| | | |
|---|---|---|
| 1,517,515 A | 12/1924 | McGary |
| 3,754,303 A | 8/1973 | Pollock |
| 3,833,969 A | 9/1974 | Hollingsworth et al. |
| 4,128,919 A | 12/1978 | Bulanda et al. |
| 4,366,602 A | 1/1983 | Conlon et al. |
| 4,399,592 A | 8/1983 | Chopp, Jr. et al. |
| 4,473,925 A | 10/1984 | Jansen |
| 4,765,032 A | 8/1988 | Fortsch |
| 4,868,953 A | 9/1989 | Fortsch |
| 4,896,402 A | 1/1990 | Jansen et al. |
| 5,115,541 A | 5/1992 | Stichel |
| 5,123,456 A | 6/1992 | Jansen |
| 5,291,637 A | 3/1994 | Meyers |
| 5,488,760 A | 2/1996 | Jansen |
| 5,644,819 A | 7/1997 | Lyons |
| 5,694,984 A | 12/1997 | Cheung |
| 6,076,235 A | 6/2000 | Khokhar |
| 6,122,804 A | 9/2000 | Gamaggio-Schafer |
| 6,477,746 B1 | 11/2002 | Axelsson |
| 6,647,596 B1 | 11/2003 | Caveney |
| 6,668,427 B2 | 12/2003 | Bulanda et al. |

FOREIGN PATENT DOCUMENTS

EP 0758616 A1 2/1997

*Primary Examiner* — Jack W. Lavinder

(74) *Attorney, Agent, or Firm* — Robert A. McCann; Christopher S. Clancy

(57) ABSTRACT

A cable tie with a reduced band thread force is disclosed, comprising an elongate metallic strap, a metallic locking head and a metallic roller means. In one embodiment, the metallic locking head comprising a strap entry notch. In another embodiment, the metallic locking head comprises a strap entry notch and a strap exit notch. In operation, the configuration of the notches, singularly or in tandem, serve to reduce the band thread force in the elongate metallic strap when the elongate metallic strap is inserted into the metallic locking head a second (and subsequent) time.

12 Claims, 6 Drawing Sheets

CABLE TIE HAVING BAND THREAD FORCE REDUCTION

CROSS REFERENCE TO RELATED APPLICATION

This application claims the benefit of U.S. Provisional Patent Application No. 60/940,762, filed on 30 May 2007.

FIELD OF THE PRESENT INVENTION

The present invention is directed to a cable tie having an elongate strap and a locking head and, more particularly, to a metallic cable tie for holding a plurality of articles together in a bundle, while reducing the band thread force present in the elongate strap and allowing for the elongate strap to be fed through the locking head a plurality of times.

BACKGROUND OF THE PRESENT INVENTION

Metallic bundling devices, such as cable ties, that incorporate locking balls and roller pins have been used for bundling a great variety of items, such as, for example, bales of cotton or a multitude of wires. A common name for these types of cable ties is the "ball lock" or "roller lock" device. In such devices, an elongate metallic strap is wrapped around the objects to be bundled and inserted into a locking head. Contained within the locking head is a metallic ball which, using the shape of the locking head (generally angled towards one end) as well as the force of gravity, lock the elongate metallic strap in place. Gravity also allows the detachment of the elongate metallic strap. By turning the locking head upside down, gravity permits the metallic ball to roll towards the other end of the locking head, thus freeing and allowing the elongate metallic strap to be removed from the locking head. Generally speaking, this process provides a bundling apparatus having a relatively high holding strength.

Various means have since been introduced in an effort to further strengthen these types of bundling apparati. One example has been the "double ball" assembly. In this assembly, the properties of two metallic balls combine to provide an even higher holding strength than that available with only one metallic ball. An example of this "double ball" assembly is disclosed in a U.S. Provisional Patent Application No. 60/886,552, entitled "Retained Tension Multiple Ball Lock Cable Tie," assigned to the same entity as the Assignee of the present invention, and filed on 25 Jan. 2007. The disclosure of this U.S. Provisional Patent Application, as well as its Non-Provisional Counterpart (U.S. patent application Ser. No. 12/018,978, filed on 24 Jan. 2008), are incorporated by reference herein in their entireties.

Another example of a means to further strengthen "ball lock" cable ties is the "double loop" assembly. In this assembly, the elongate metallic strap is threaded through the locking head more than one time. The result is a bundling apparatus having a very high holding strength.

Both the "double ball" and the "double loop" assemblies provide a heightened level of holding strength. Additionally, both assemblies are adaptable for many uses.

However, the "double loop" assembly is not without its drawbacks. FIG. 1 represents the current state of the art in "double loop" cable tie assemblies. Referring to FIG. 1, the initial insertion of the elongate metallic strap into the locking head causes a phenomenon known as "band thread force." The band thread force results from the fact that the floor of the locking head is flat, while the elongate metallic strap, when wrapped around the bundle of articles, takes on an arcuate form. Thus, the elongate metallic strap does not sit flush against the floor of the locking head. In "single loop" assemblies, this is not a major issue, as the roller means can nevertheless lock into place within the locking head and prohibit the release of the elongate metallic strap from the locking head. However, in "double loop" assemblies, the band thread force makes it difficult to thread the elongate metallic strap in the locking head a second time.

U.S. Pat. No. 6,076,235, entitled "Cable Tie" and issued to Wasim Khokhar on 20 Jun. 2000, illustrates one attempt to develop a locking head that provides a reduction in the band thread force. In the locking head disclosed in the '235 patent, a notch was formed in the floor of the locking head proximate the strap entry face. This provided for a slight release of the band thread force within the locking head. U.S. Pat. No. 4,765,032, entitled "Environmental Bundling Tie," and issued to William A. Fortsch on 23 Aug. 1998, also attempted to solve the band thread force problem by employing a similar solution. Both disclosures of the '235 and the '032 patents are hereby incorporated by reference in their entireties.

Although the above references attempted to provide a solution to the problem of the band thread force, a substantial reduction in the band thread force did not result, and the issue still remains. Thus, it would be desirable to provide a "double loop" cable tie assembly having a substantially-reduced band thread force that overcomes the disadvantages in the previously disclosed devices.

SUMMARY OF THE PRESENT INVENTION

A cable tie with a reduced band thread force is disclosed, comprising an elongate metallic strap, a metallic locking head and a metallic roller means. In one embodiment, the metallic locking head comprises a strap entry notch. In another embodiment, the metallic locking head comprises a strap entry notch and a strap exit notch. In operation, the configuration of the notches, singularly or in tandem, serve to reduce the band thread force in the elongate metallic strap when the elongate metallic strap is inserted into the metallic locking head a second (and subsequent) time.

DETAILED DESCRIPTION OF THE PREFERRED EMBODIMENTS

The illustrated embodiments of the present invention are directed to a three-piece cable tie that uses a combination of a roller means and a locking head to secure an elongate strap therein.

Figure 1:
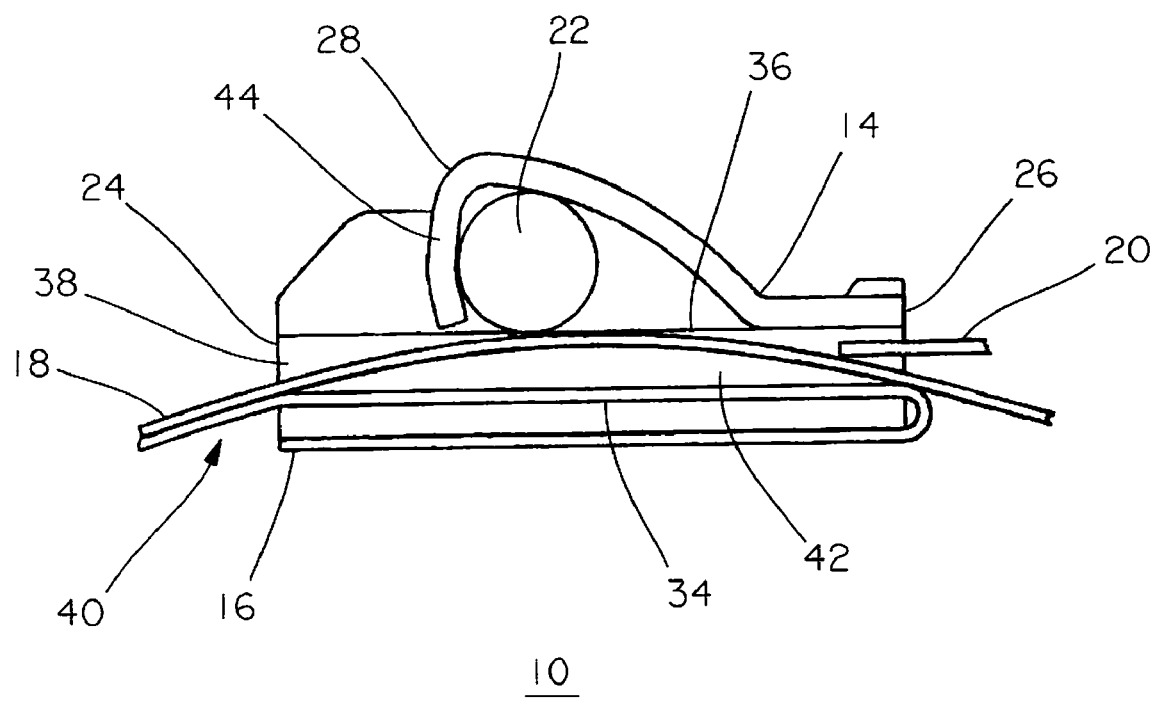
FIG. 1 illustrates a side view of the current state of a metal cable tie adaptable for a "double loop" assembly.
Figure 2:
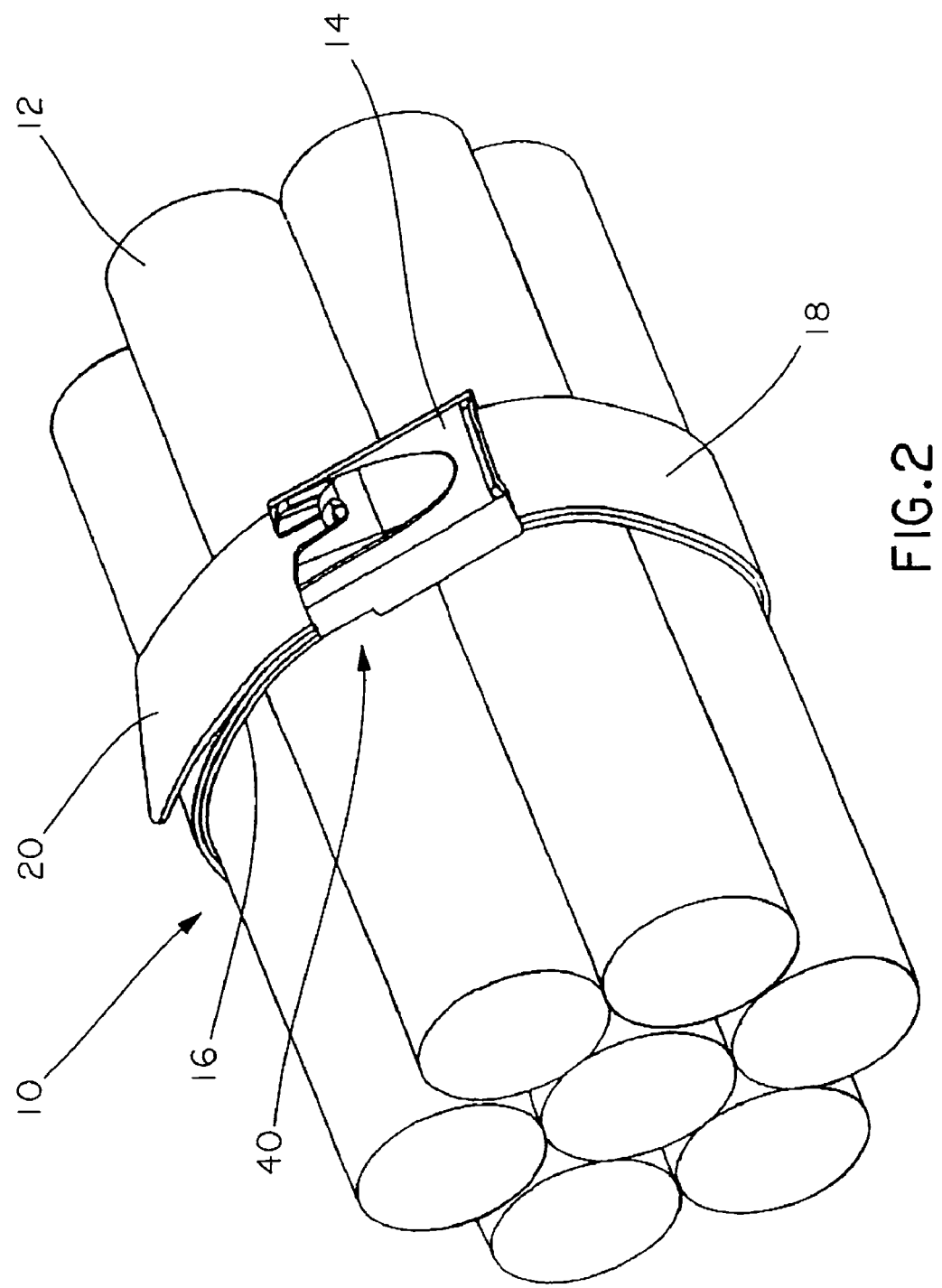
FIG. 2 illustrates a perspective view of a metal cable tie, manufactured in accordance with the tenets and teachings of the present invention shown secured around a bundle of wires.
Figure 3:
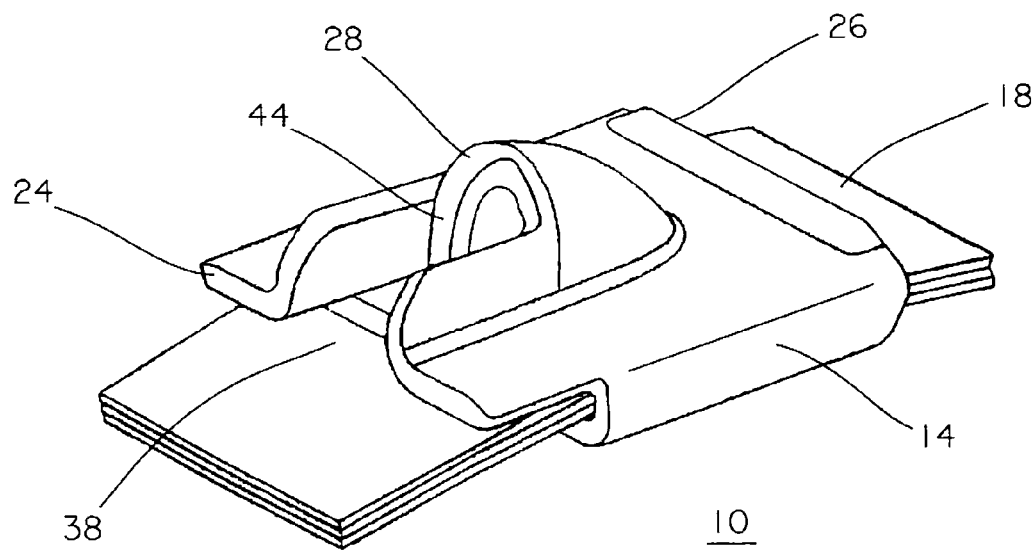
FIG. 3 illustrates a perspective view of the locking head of the metal cable tie of FIG. 2.
Figure 4:
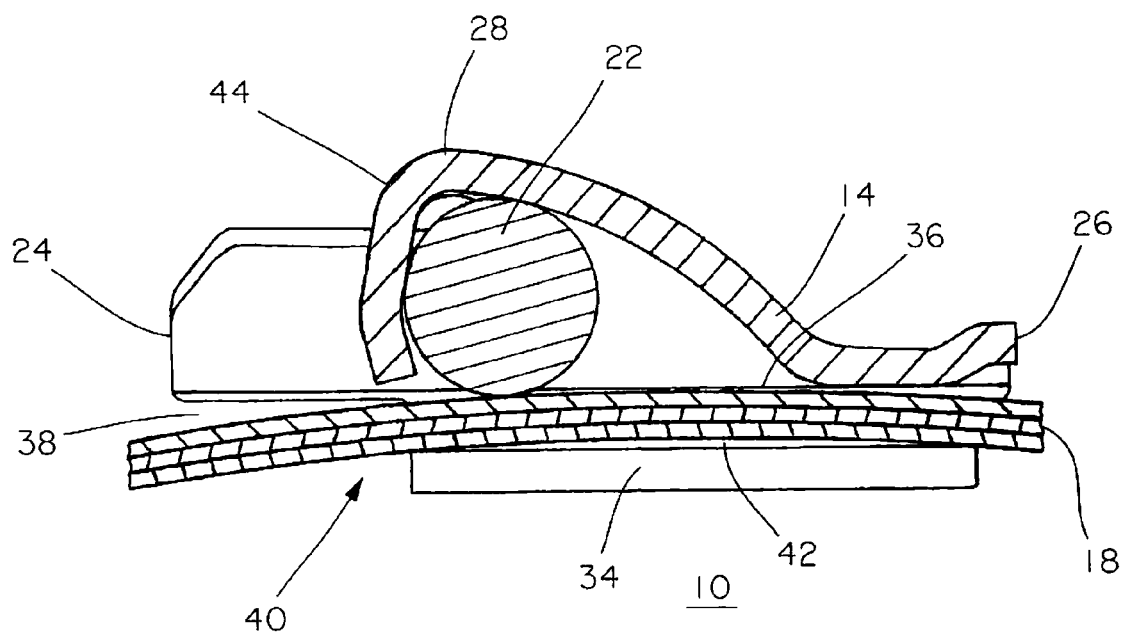
FIG. 4 illustrates a side sectional view of the elongate strap and the locking head of the metal cable tie of FIG. 2.
Figure 5:
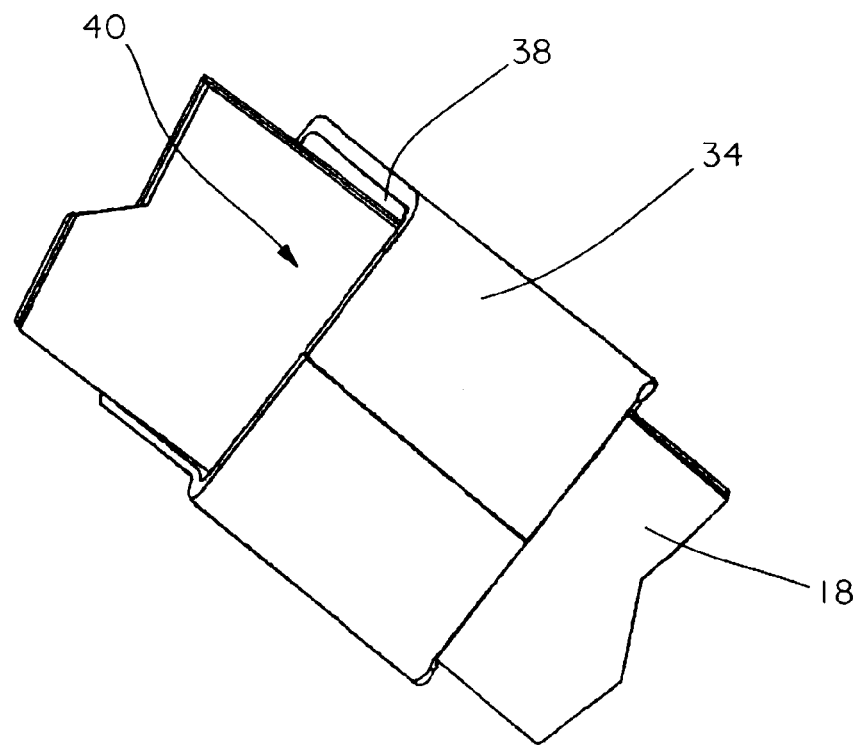
FIG. 5 illustrates an underside perspective view of the locking head of the metal cable tie of FIG. 2.
Figure 6:
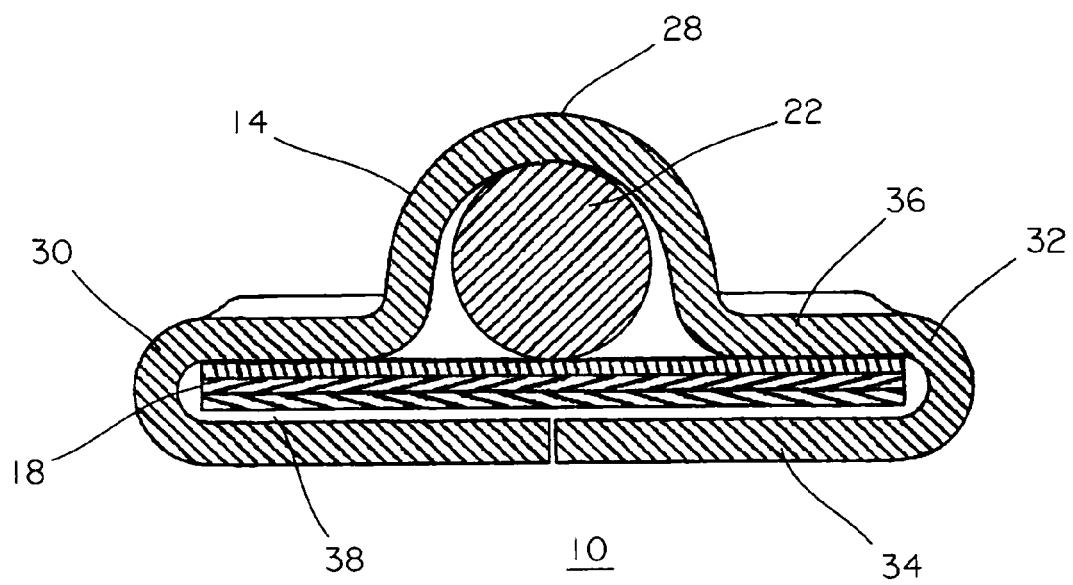
FIG. 6 illustrates a front sectional view of the elongate strap and the locking head of the metal cable tie of FIG. 2.

Referring now to the Figures, in which like elements are represented by the same reference numerals, a cable tie for bundling a plurality of elongate objects, such as wires 12, and for holding those elongated objects together, is generally indicated in FIG. 2 by reference numeral 10. Cable tie 10 preferably includes locking head 14 and roller means (not visible in FIG. 2). As more clearly illustrated in FIGS. 3-9, locking head 14 preferably receives first end 16 of elongate strap 18, and is adapted to additionally receive second end 20 of elongate strap 18. Additionally, second end 20 of elongate strap 18 may be inserted into locking head 14 a subsequent time. As is illustrated by the Figures, elongate strap 18 is fed through locking head 14 in such a manner that there is no secure connection between locking head 14 and elongate strap 18. Nevertheless, the tenets and teachings of the present invention will be achieved, as the insertion of elongate strap 18 into locking head 14 a second (and any subsequent) time will prevent the unraveling of elongate strap 18, based on the effects of friction between the portions of elongate strap 18 in contact with each other, as well as the effects of both gravity and geometry on roller means 22. Alternatively, as is illustrated by FIG. 4, first end 16 of elongate strap 18 may be secured to locking head 14 by any known means. Roller means 22 is preferably illustrated in the form of a ball or sphere-like object, most clearly illustrated in FIG. 4, for retaining elongate strap 18 within locking head 14.

Roller means 22, locking head 14 and elongate strap 18 each can be formed of stainless steel—or any other suitable material, including both other metals and plastics—to allow the devices to be used over a wide temperature range and to give cable tie 10 both a high strength and an excellent resistance to corrosion. Additionally, by means currently known in the art, elongate strap 18 may be selectively coated with any known corrosion-resistant coating, such as that disclosed in U.S. Pat. No. 5,103,534 or U.S. patent application Ser. No. 10/794,613, the disclosures of which are hereby incorporated herein by reference in their entireties. Further, elongate strap 18 may also be color coded, according to OSHA safety standards. Moreover, the surface of roller means 22 can be textured or roughened to increase its friction coefficient with the other elements of cable tie 10 (i.e., locking head 14 and elongate strap 18).

FIGS. 3-7 illustrate one embodiment of locking head 14, in accordance with the tenets and teachings of the present invention, in more detail. Referring to FIGS. 3-7, locking head 14 is illustrated as generally comprising strap entry face 24, strap exit face 26, retention means 28, first side wall 30, second side wall 32, floor 34 and roof 36.

Floor 34 and roof 36 are preferably joined by first side wall 30 and second side wall 32. This is illustrated most clearly in FIG. 6. In doing so, these elements define strap-receiving aperture 38, which extends the length of locking head 14 between strap entry face 24 and strap exit face 26. Referring back to FIGS. 3-6, it is illustrated that roof 36 diverges in the direction of floor 34 as locking head 14 progresses from strap entry face 24 to strap exit face 26.

Additionally with reference to floor 34, it is illustrated that floor 34 defines strap entry notch 40. Strap entry notch 40 comprises an indentation within the bottom portion of strap entry face 24. The size of the indentation, which reduces the overall length of floor 34, allows a substantial release of the band thread force, thus making it easier to insert elongate strap 18 into strap entry face 24 a subsequent time. As shown in FIG. 4. the result of the band thread force, shown as open area 42, is greatly reduced. The reduction in open area 42 provides for a greater strap-receiving aperture 38, which allows elongate strap 18 to be inserted into locking head 14 a second (and subsequent) time.

Figure 7:
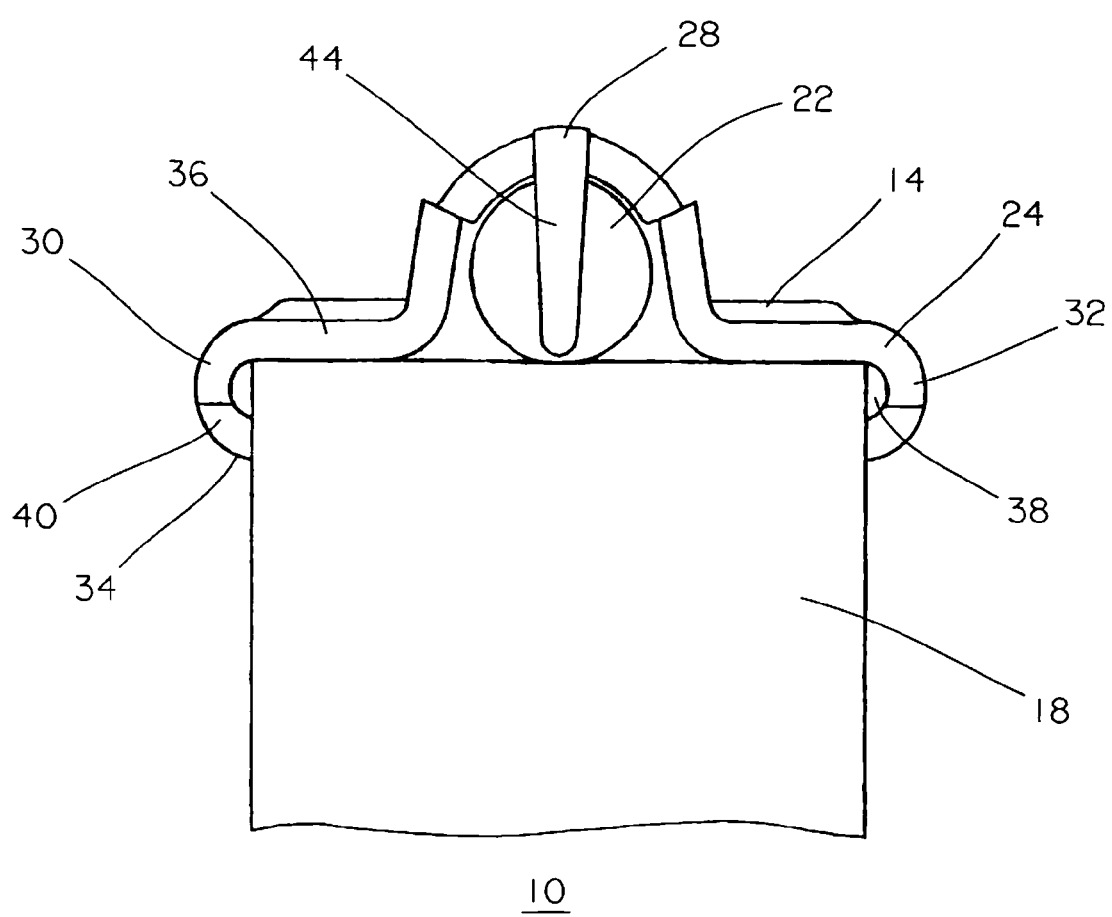
FIG. 7 illustrates a top perspective view of the metal cable tie of FIG. 2.

Regarding the locking of cable tie 10, as more closely illustrated in FIGS. 4 and 7, roller means 22 is captively held between roof 36 and floor 34 by retention means 28. Retention means 28 comprises finger 44 extending from roof 36 towards floor 34 adjacent strap exit face 26.

It is contemplated that roller means 22 is movable between a threading position, not illustrated in the Figures, wherein roller means 22 is disposed as engaging finger 44, and proximate to strap exit face 26, and a locking position, wherein roller means 22 is closer to strap entry face 24 and securely engages elongate strap 18. In the threading position, roller means 22 concurrently engages finger 44 and roof 36.

In operation, and once again referring to the Figures, after elongate strap 18 is wrapped around the objects (e.g., wires 12) to be held, second end 20 of elongate strap 18 is inserted into locking head 14. Continued threading of elongate strap 18 results in positive engagement of elongate strap 18 with roller means 22 at any angle locking head 14 is held. As a result of the strength and nature of elongate strap 18, a positive band thread force will be exerted upon by elongate strap 18, thrusting elongate strap 18 up from floor 34 of locking head 14, through strap-receiving aperture 38 and towards roof 36 of locking head 14. In some instances, this band thread force may make it extremely difficult to insert second end 20 of elongate strap 18 into locking head 14 a second time. However, due to the placement of strap entry notch 40, the positive band thread force is reduced, allowing a user to more easily insert second end 20 of elongate strap 18 into locking head 14 a second time.

Figure 8:
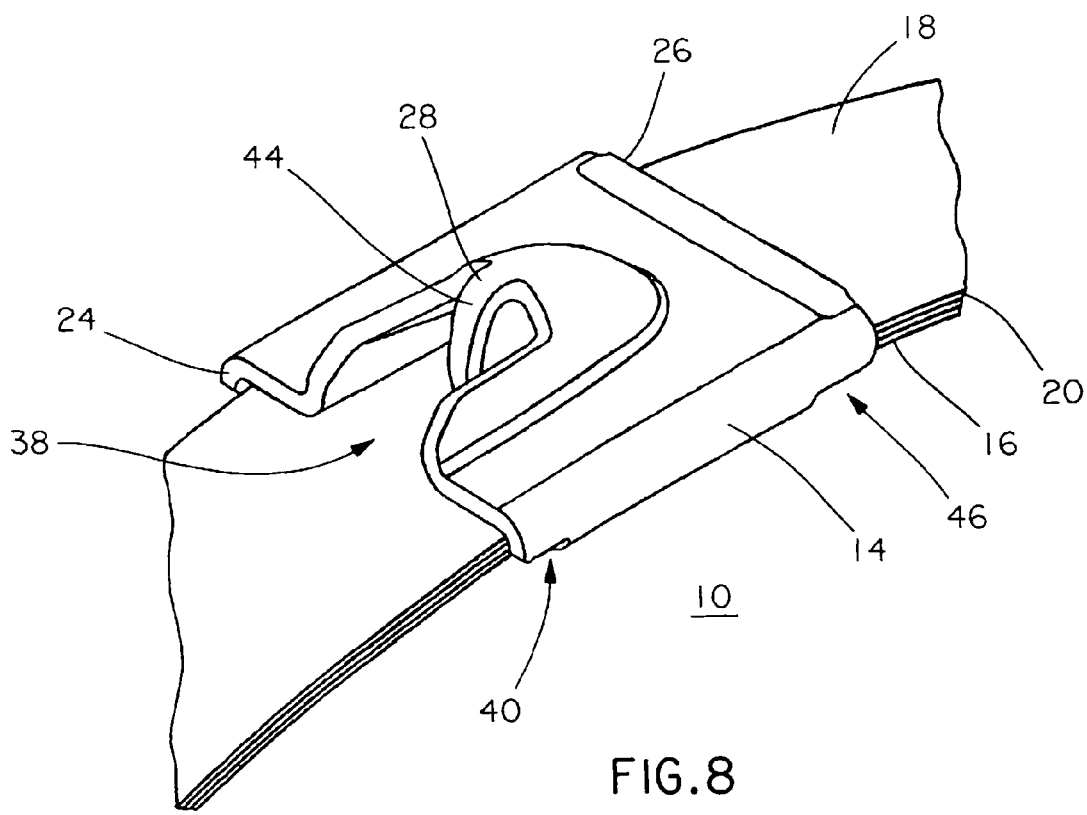
FIG. 8 illustrates a perspective view of an alternate embodiment of the locking head of the metal cable tie of FIG. 2.
Figure 9:
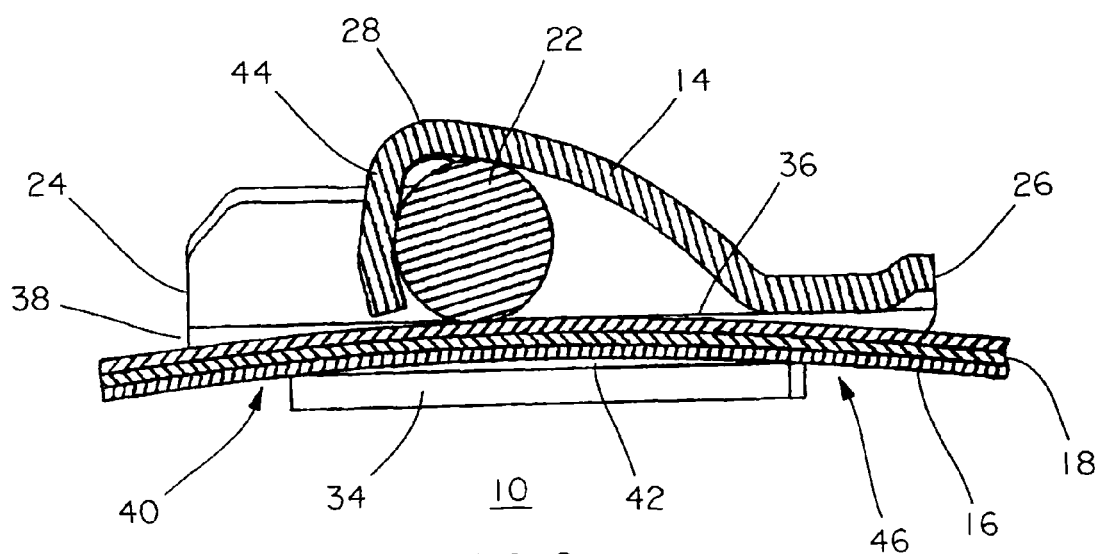
FIG. 9 illustrates a side sectional view of an alternate embodiment of the elongate strap and the locking head of the metal cable tie of FIG. 2.

In an alternate embodiment, as illustrated in FIGS. 8-9, strap entry notch 40 may be reduced in length, and locking head 14 is provided with strap exit notch 46. In this embodiment, strap entry notch 40 and strap exit notch 46 combine to comprise indentations within the bottom portion of strap entry face 24 and strap exit face 26. Similar to the embodiment described above, the size of the indentations, which reduces the overall length of floor 34, allows a substantial release of the band thread force, thus making it easier to insert elongate strap 18 into strap entry face 24 a subsequent time. Again, similar to the embodiment described above, as shown in FIG. 9, the result of the band thread force, shown as open area 44, is greatly reduced. Thus, the reduction in open area 42 provides for a greater strap-receiving aperture 38, which allows elongate strap 18 to be inserted into locking head 14 a second (and subsequent) time.

The disclosed present invention provides a cable tie that allows for a reduction in the band thread force. It should be noted that the above-described and illustrated embodiments and preferred embodiments of the present invention are not an exhaustive listing of the forms such a cable tie in accordance with the present invention might take: rather, they serve as exemplary and illustrative of embodiments of the present invention as presently understood. Many other forms of the present invention exist and are readily apparent to one having ordinary skill in the art.

The invention claimed is:

1. A cable tie comprising:
   an elongate metallic strap, the elongate metallic strap having a first end and a second end, the second end being opposite the first end on the elongate metallic strap; and
   a metallic locking head, the metallic locking head being positioned along the length of the elongate metallic strap, the metallic locking head being adapted to receive the second end of the elongate metallic strap, wherein the metallic locking head comprises a floor and a roof joined by a first side wall and a second side wall, a retention means extending from the roof, a strap entry face, and a strap exit face,
   wherein the floor defines a strap entry notch, the strap entry notch is disposed below the retention means, the strap entry notch comprising an indentation within a bottom portion of the strap entry face reducing the overall length of the floor; and
   wherein a band threading force results when the elongate metallic strap is fed into the strap entry face, and wherein the strap entry notch serves to reduce the band threading force, allowing the elongate metallic strap to be fed into the strap entry face at least one additional time.

2. The cable tie of claim 1, wherein the retention means comprising a finger, the finger adapted to captively hold a metallic roller means within the metallic locking head.

3. The cable tie of claim 2, wherein the metallic roller means lockingly engages the elongate metallic strap.

4. The cable tie of claim 3, wherein the metallic locking head is secured to the first end of the elongate metallic strap.

5. The cable tie of claim 3, wherein the elongate metallic strap is coated.

6. The cable tie of claim 5, wherein the elongate metal strap comprises stainless steel.

7. The cable tie of claim 3, wherein the metallic locking head further comprises a strap-receiving aperture extending between the strap entry face and the strap exit face.

8. A cable tie comprising:
   an elongate metallic strap, the elongate metallic strap having a first end and a second end, the second end being opposite the first end on the elongate metallic strap; and
   a metallic locking head, the metallic locking head being positioned along the length of the elongate metallic strap, the metallic locking head being adapted to receive the second end of said elongate metallic strap, wherein the metallic locking head comprises a floor and a roof joined by a first side wall and a second side wall, a retention means extending from the roof, a strap entry face, and a strap exit face;
   wherein the floor defines a strap entry notch and a strap exit notch, the strap entry notch is disposed below the retention means, the strap entry notch comprising an indentation within a bottom portion of the strap entry face and the strap exit notch comprising an indention within a bottom portion of the strap exit face reducing the overall length of the floor; and
   wherein a band threading force results when the elongate metallic strap is fed into the strap entry face, and wherein the strap entry notch and the strap exit notch serve to reduce the band threading force, allowing the elongate metallic strap to be fed into the strap entry face at least one additional time.

9. The cable tie of claim 8, wherein the retention means comprising a finger, the finger adapted to captively hold a metallic roller means within the metallic locking head.

10. The cable tie of claim 9, the metallic roller means lockingly engages the elongate metallic strap.

11. The cable tie of claim 10, wherein the metallic locking head is secured to the first end of the elongate metallic strap.

12. The cable tie of claim 10, wherein the metallic locking head further comprises a strap-receiving aperture extending between the strap entry face and the strap exit face.

* * * * *